United States Patent
Baskaran et al.

(10) Patent No.: US 12,462,242 B2
(45) Date of Patent: Nov. 4, 2025

(54) METHOD AND SYSTEM FOR FACILITATING CONTACTLESS PAYMENT

(71) Applicant: JPMorgan Chase Bank, N.A., New York, NY (US)

(72) Inventors: Srinivasan Baskaran, McKinney, TX (US); Venkata Sudheer Babu Chundi, Plano, TX (US); Mizan Miah, Wilmington, DE (US); Rasanjaya Herath Mudiyanselage, Irving, TX (US); Justin Robinson, Tampa, FL (US); Akmsaleh Sultan, Richardson, TX (US); Carlos Romero, Fort Myers Beach, FL (US); Cesar Lopez Garcia, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 96 days.

(21) Appl. No.: 18/139,696

(22) Filed: Apr. 26, 2023

(65) Prior Publication Data

US 2024/0362611 A1 Oct. 31, 2024

(51) Int. Cl.
*G06Q 20/32* (2012.01)
*G06Q 20/20* (2012.01)
*G06Q 20/40* (2012.01)

(52) U.S. Cl.
CPC ......... *G06Q 20/325* (2013.01); *G06Q 20/204* (2013.01); *G06Q 20/326* (2020.05); *G06Q 20/4014* (2013.01)

(58) Field of Classification Search
CPC .................................................. G06Q 40/00
USPC ............................................................ 705/35
See application file for complete search history.

(56) References Cited

U.S. PATENT DOCUMENTS

| | | | | |
|---|---|---|---|---|
| 5,237,159 A | * | 8/1993 | Stephens | G06Q 40/02 705/45 |
| 5,265,007 A | * | 11/1993 | Barnhard, Jr. | G06Q 20/023 705/45 |
| 5,484,988 A | * | 1/1996 | Hills | G06Q 20/04 235/379 |
| 5,691,524 A | * | 11/1997 | Josephson | G06Q 20/102 705/40 |
| 5,717,868 A | * | 2/1998 | James | G06Q 20/10 705/35 |

(Continued)

*Primary Examiner* — Kirsten S Apple
(74) *Attorney, Agent, or Firm* — Greenblum & Bernstein, P.L.C.

(57) ABSTRACT

A method for facilitating contactless payment at a point-of-sale is disclosed. The method includes receiving, via a terminal, a selection from a user at the point-of-sale, the selection corresponding to a payment preference; determining a transaction type based on the selection, the transaction type including a first transaction via a digital payment network and a second transaction via a mobile wallet; providing, via the terminal, transaction information and a transaction token to a mobile device that is associated with the user based on the determined transaction type; receiving, via the mobile device, a transaction request that includes the transaction information, the transaction token, and user payment information; initiating an electronic transaction based on the transaction request; and transmitting a result of the electronic transaction to the terminal and to the mobile device.

20 Claims, 8 Drawing Sheets

(56) References Cited

U.S. PATENT DOCUMENTS

| | | | | |
|---|---|---|---|---|
| 5,783,808 | A * | 7/1998 | Josephson | G06Q 20/14 235/379 |
| 5,910,989 | A * | 6/1999 | Naccache | G06Q 20/341 713/180 |
| 5,983,197 | A * | 11/1999 | Enta | G07F 19/20 705/16 |
| 6,016,484 | A * | 1/2000 | Williams | G06Q 20/02 235/375 |
| 6,164,528 | A * | 12/2000 | Hills | G06Q 20/04 235/379 |
| 6,189,785 | B1 * | 2/2001 | Lowery | G06Q 20/042 705/45 |
| 6,193,152 | B1 * | 2/2001 | Fernando | G06Q 20/40145 235/383 |
| 6,230,148 | B1 * | 5/2001 | Pare, Jr. | H04L 63/0823 705/40 |
| 6,328,207 | B1 * | 12/2001 | Gregoire | G06Q 20/305 705/45 |
| 6,581,042 | B2 * | 6/2003 | Pare, Jr. | G06F 21/554 705/40 |
| 6,644,546 | B2 * | 11/2003 | George | G06Q 20/042 705/42 |
| 6,662,166 | B2 * | 12/2003 | Pare, Jr. | G06Q 20/18 705/72 |
| 6,950,810 | B2 * | 9/2005 | Lapsley | G06Q 20/367 705/64 |
| 6,970,855 | B2 * | 11/2005 | Das | G06Q 10/08345 705/16 |
| 7,099,845 | B2 * | 8/2006 | Higgins | G06Q 20/0425 705/45 |
| 7,216,800 | B1 * | 5/2007 | Ramachandran | G06Q 20/425 235/379 |
| 7,359,880 | B2 * | 4/2008 | Abel | G06Q 20/108 705/40 |
| 7,430,537 | B2 * | 9/2008 | Templeton | G06Q 40/12 705/40 |
| 8,157,164 | B1 * | 4/2012 | Billman | G07F 19/203 235/375 |
| 9,558,636 | B1 * | 1/2017 | Burdick | H04W 12/068 |
| 10,467,604 | B1 * | 11/2019 | Dorsch | G07F 19/20 |
| 10,496,986 | B2 * | 12/2019 | Narayan | G06Q 20/38215 |
| 11,308,481 | B1 * | 4/2022 | Thomas | G06Q 20/4012 |
| 11,775,977 | B1 * | 10/2023 | Kruse | G06Q 20/4014 705/40 |
| 11,948,136 | B1 * | 4/2024 | Thimmareddy | G06Q 20/3224 |
| 12,067,543 | B2 * | 8/2024 | Hill | G06Q 20/4037 |
| 2002/0004760 | A1 * | 1/2002 | Yoshida | G06Q 20/12 705/26.1 |
| 2002/0065774 | A1 * | 5/2002 | Young | G06Q 20/02 705/41 |
| 2003/0236746 | A1 * | 12/2003 | Turner | G06Q 20/102 705/40 |
| 2004/0143553 | A1 * | 7/2004 | Torget | G06Q 20/042 705/66 |
| 2008/0319875 | A1 * | 12/2008 | Levchin | G06Q 40/00 705/44 |
| 2012/0197797 | A1 * | 8/2012 | Grigg | G06Q 20/1085 705/43 |
| 2015/0127547 | A1 * | 5/2015 | Powell | G06Q 20/4016 705/67 |
| 2015/0186871 | A1 * | 7/2015 | Laracey | G06Q 20/322 705/41 |
| 2015/0287017 | A1 * | 10/2015 | Iqbal | G06Q 20/3223 705/44 |
| 2016/0078417 | A1 * | 3/2016 | Deluca | G07F 9/001 705/43 |
| 2018/0068297 | A1 * | 3/2018 | Goodman | G06Q 40/02 |
| 2018/0165663 | A1 * | 6/2018 | Naik | G06Q 20/3223 |
| 2022/0051210 | A1 * | 2/2022 | Phillips | G06Q 20/1085 |
| 2024/0193603 | A1 * | 6/2024 | Wolfs | G06Q 20/4012 |

* cited by examiner

600

700

800

METHOD AND SYSTEM FOR FACILITATING CONTACTLESS PAYMENT

BACKGROUND

1. Field of the Disclosure

This technology generally relates to methods and systems for electronic payment, and more particularly to methods and systems for facilitating contactless payment at a point-of-sale by using machine-readable optical labels and remote wallets.

2. Background Information

Many business entities require payment at the point-of-sale to provide goods and services. Often, the payments are conducted electronically to transfer funds from one account to another without requiring an exchange of physical currency. Historically, implementations of conventional electronic payment techniques at the point-of-sale have resulted in varying degrees of success with respect to usability and transaction security.

One drawback of using the conventional electronic payment techniques is that in many instances, a purchaser must provide a vendor sensitive payment information such as, for example, an account number. As a result, a gap in transaction security is created, which may lead to potential exposure of the sensitive payment information. Additionally, conventional electronic payment techniques at the point-of-sale often require access to a physical device such as, for example, a credit and/or debit card that is issued by a financial institution. Thus, for conventional electronic payment techniques, electronic transactions at the point-of-sale may not be possible without the physical device.

Therefore, there is a need for contactless payment options at the point-of-sale that utilizes machine-readable optical labels and remote wallets to securely provide purchaser information and facilitate electronic transactions.

SUMMARY

The present disclosure, through one or more of its various aspects, embodiments, and/or specific features or sub-components, provides, inter alia, various systems, servers, devices, methods, media, programs, and platforms for facilitating contactless payment at a point-of-sale by using machine-readable optical labels and remote wallets.

According to an aspect of the present disclosure, a method for facilitating contactless payment at a point-of-sale is disclosed. The method is implemented by at least one processor. The method may include receiving, via a terminal, at least one selection from a user at the point-of-sale, the at least one selection may correspond to a payment preference; determining a transaction type based on the at least one selection, the transaction type may include at least one from among a first transaction via a digital payment network and a second transaction via a mobile wallet; providing, via the terminal, transaction information and a transaction token to a mobile device that is associated with the user based on the determined transaction type; receiving, via the mobile device, a transaction request that includes the transaction information, the transaction token, and user payment information; initiating an electronic transaction based on the transaction request; and transmitting a result of the electronic transaction to the terminal and to the mobile device.

In accordance with an exemplary embodiment, the digital payment network may enable at least one electronic transaction between a plurality of users at the point-of-sale.

In accordance with an exemplary embodiment, the terminal may correspond to at least one from among a point-of-sale terminal that is operated by a vendor and a computing terminal that is usable by the user for electronic commerce.

In accordance with an exemplary embodiment, to provide the transaction information and the transaction token to the mobile device when the transaction type corresponds to the first transaction, the method may further include generating at least one code, the at least one code may correspond to a machine-readable optical label that includes the transaction information and the transaction token; and displaying, via the terminal, the at least one code for the user in response to the at least one selection, wherein the at least one code may be scannable by the mobile device to initiate the transaction request according to the transaction information.

In accordance with an exemplary embodiment, to provide the transaction information and the transaction token to the mobile device when the transaction type corresponds to the second transaction, the method may further include displaying, via the terminal, at least one prompt for the user in response to the at least one selection, the at least one prompt may include a request for information relating to a preferred communication channel; generating a payment link and a corresponding web application that includes the transaction information and the transaction token; and transmitting, via the preferred communication channel, the payment link to the user according to the requested information, wherein interaction with the web application may trigger the mobile wallet to initiate the transaction request according to the transaction information.

In accordance with an exemplary embodiment, the preferred communication channel may include at least one from among a cellular text, an email, and a push notification for the mobile device.

In accordance with an exemplary embodiment, the requested information may include at least one from among a phone number, an email address, and a user login.

In accordance with an exemplary embodiment, the transaction information may correspond to at least one payment parameter for the electronic transaction, the at least one payment parameter may include a transaction amount and a vendor identifier.

In accordance with an exemplary embodiment, prior to initiating the electronic transaction, the method may further include validating the transaction request by using the transaction token.

According to an aspect of the present disclosure, a computing device configured to implement an execution of a method for facilitating contactless payment at a point-of-sale is disclosed. The computing device including a processor; a memory; and a communication interface coupled to each of the processor and the memory, wherein the processor may be configured to receive, via a terminal, at least one selection from a user at the point-of-sale, the at least one selection may correspond to a payment preference; determine a transaction type based on the at least one selection, the transaction type may include at least one from among a first transaction via a digital payment network and a second transaction via a mobile wallet; provide, via the terminal, transaction information and a transaction token to a mobile device that is associated with the user based on the determined transaction type; receive, via the mobile device, a transaction request that includes the transaction information, the transaction token, and user payment information; initiate an electronic transaction based on the transaction request; and transmit a result of the electronic transaction to the terminal and to the mobile device.

In accordance with an exemplary embodiment, the digital payment network may enable at least one electronic transaction between a plurality of users at the point-of-sale.

In accordance with an exemplary embodiment, the terminal may correspond to at least one from among a point-of-sale terminal that is operated by a vendor and a computing terminal that is usable by the user for electronic commerce.

In accordance with an exemplary embodiment, to provide the transaction information and the transaction token to the mobile device when the transaction type corresponds to the first transaction, the processor may be further configured to generate at least one code, the at least one code may correspond to a machine-readable optical label that includes the transaction information and the transaction token; and display, via the terminal, the at least one code for the user in response to the at least one selection, wherein the at least one code may be scannable by the mobile device to initiate the transaction request according to the transaction information.

In accordance with an exemplary embodiment, to provide the transaction information and the transaction token to the mobile device when the transaction type corresponds to the second transaction, the processor may be further configured to display, via the terminal, at least one prompt for the user in response to the at least one selection, the at least one prompt may include a request for information relating to a preferred communication channel; generate a payment link and a corresponding web application that includes the transaction information and the transaction token; and transmit, via the preferred communication channel, the payment link to the user according to the requested information, wherein interaction with the web application may trigger the mobile wallet to initiate the transaction request according to the transaction information.

In accordance with an exemplary embodiment, the preferred communication channel may include at least one from among a cellular text, an email, and a push notification for the mobile device.

In accordance with an exemplary embodiment, the requested information may include at least one from among a phone number, an email address, and a user login.

In accordance with an exemplary embodiment, the transaction information may correspond to at least one payment parameter for the electronic transaction, the at least one payment parameter may include a transaction amount and a vendor identifier.

In accordance with an exemplary embodiment, prior to initiating the electronic transaction, the processor may be further configured to validate the transaction request by using the transaction token.

According to an aspect of the present disclosure, a non-transitory computer readable storage medium storing instructions for facilitating contactless payment at a point-of-sale is disclosed. The storage medium including executable code which, when executed by a processor, may cause the processor to receive, via a terminal, at least one selection from a user at the point-of-sale, the at least one selection may correspond to a payment preference; determine a transaction type based on the at least one selection, the transaction type may include at least one from among a first transaction via a digital payment network and a second transaction via a mobile wallet; provide, via the terminal, transaction information and a transaction token to a mobile device that is associated with the user based on the determined transaction type; receive, via the mobile device, a transaction request that includes the transaction information, the transaction token, and user payment information; initiate an electronic transaction based on the transaction request; and transmit a result of the electronic transaction to the terminal and to the mobile device.

In accordance with an exemplary embodiment, the digital payment network may enable at least one electronic transaction between a plurality of users at the point-of-sale, and the terminal may correspond to at least one from among a point-of-sale terminal that is operated by a vendor and a computing terminal that is usable by the user for electronic commerce.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
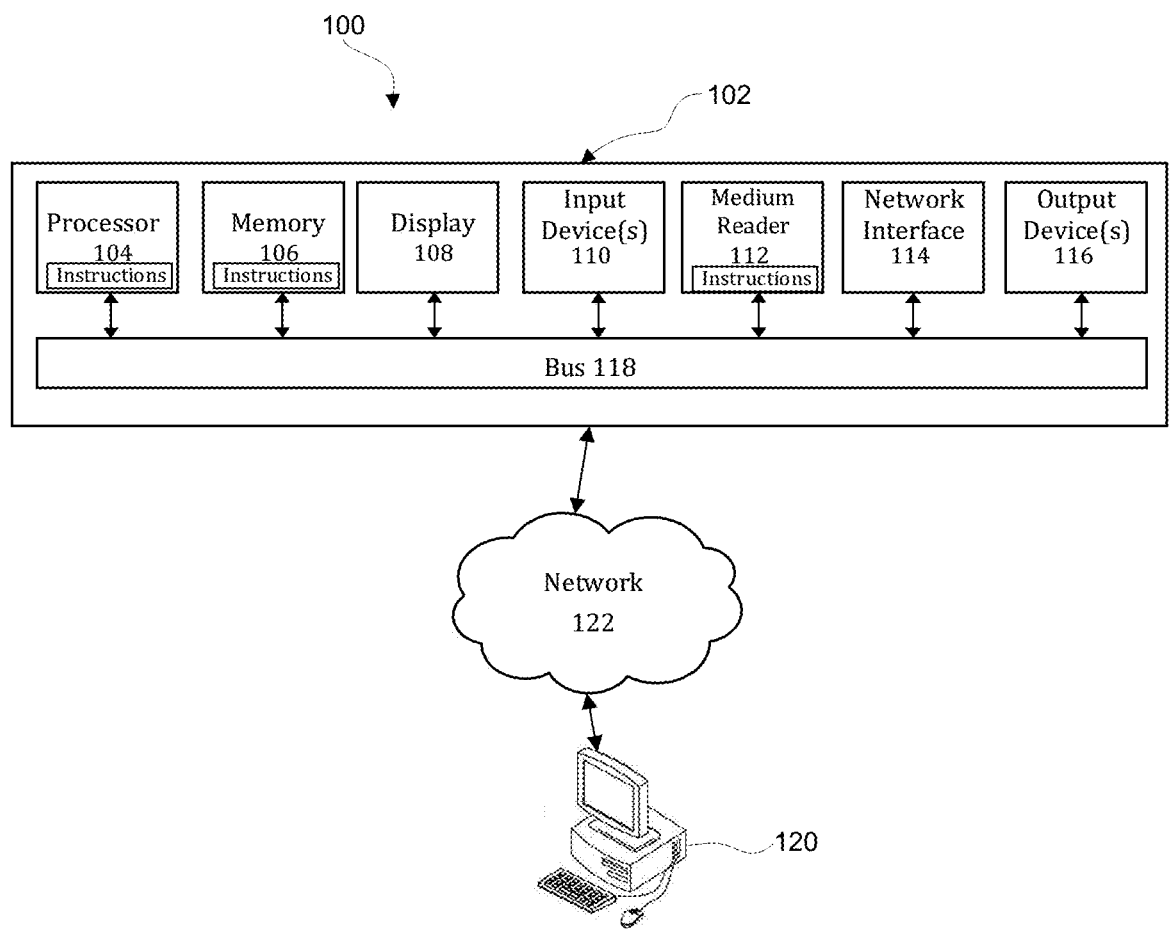
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating contactless payment at a point-of-sale by using machine-readable optical labels and remote wallets.

Figure 2:
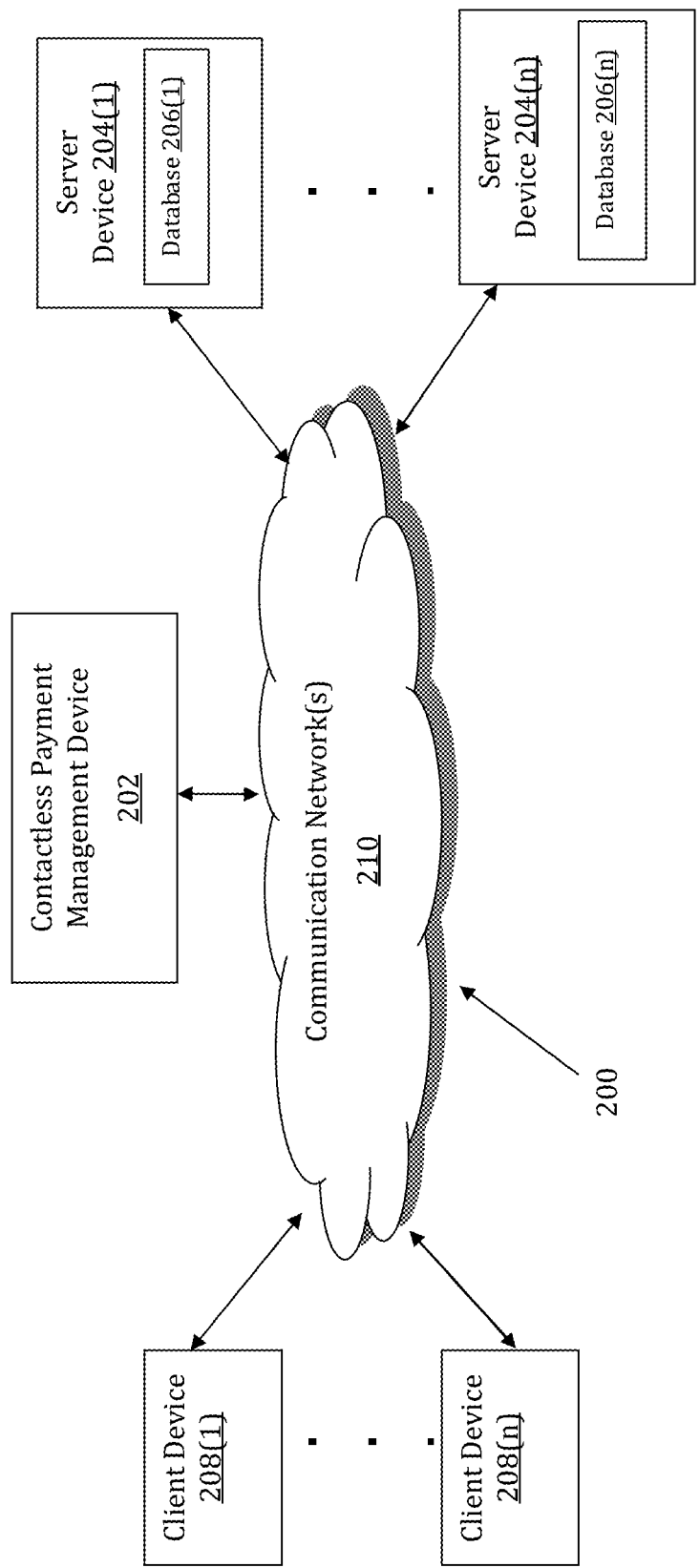
FIG. 2 illustrates an exemplary diagram of a network environment.

Referring to FIG. 2, a schematic of an exemplary network environment 200 for implementing a method for facilitating contactless payment at a point-of-sale by using machine-readable optical labels and remote wallets is illustrated. In an exemplary embodiment, the method is executable on any networked computer platform, such as, for example, a personal computer (PC).

The method for facilitating contactless payment at a point-of-sale by using machine-readable optical labels and remote wallets may be implemented by a Contactless Payment Management (CPM) device 202. The CPM device 202 may be the same or similar to the computer system 102 as described with respect to FIG. 1. The CPM device 202 may store one or more applications that can include executable instructions that, when executed by the CPM device 202, cause the CPM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CPM device 202 itself, may be located in virtual server(s) running in a cloud-based computing environment rather than being tied to one or more specific physical network computing devices. Also, the application(s) may be running in one or more virtual machines (VMs) executing on the CPM device 202. Additionally, in one or more embodiments of this technology, virtual machine(s) running on the CPM device 202 may be managed or supervised by a hypervisor.

In the network environment 200 of FIG. 2, the CPM device 202 is coupled to a plurality of server devices 204(1)-204 (*n*) that hosts a plurality of databases 206(1)-206 (*n*), and also to a plurality of client devices 208(1)-208 (*n*) via communication network(s) 210. A communication interface of the CPM device 202, such as the network interface 114 of the computer system 102 of FIG. 1, operatively couples and communicates between the CPM device 202, the server devices 204(1)-204 (*n*), and/or the client devices 208(1)-208 (*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CPM device 202, the server devices 204(1)-204 (*n*), and/or the client devices 208(1)-208 (*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CPM devices that efficiently implement a method for facilitating contactless payment at a point-of-sale by using machine-readable optical labels and remote wallets.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CPM device 202 may be a standalone device or integrated with one or more other devices or apparatuses, such as one or more of the server devices 204(1)-204 (n), for example. In one particular example, the CPM device 202 may include or be hosted by one of the server devices 204(1)-204 (n), and other arrangements are also possible. Moreover, one or more of the devices of the CPM device 202 may be in a same or a different communication network including one or more public, private, or cloud networks, for example.

The plurality of server devices 204(1)-204 (n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204 (n) in this example may process requests received from the CPM device 202 via the communication network(s) 210 according to the HTTP-based and/or JavaScript Object Notation (JSON) protocol, for example, although other protocols may also be used.

The server devices 204(1)-204 (n) may be hardware or software or may represent a system with multiple servers in a pool, which may include internal or external networks. The server devices 204(1)-204 (n) hosts the databases 206(1)-206 (n) that are configured to store data that relates to user selections, payment preferences, transaction types, payment transactions, transaction information, transaction token, transaction requests, user payment information, electronic transactions, and transaction results.

Although the server devices 204(1)-204 (n) are illustrated as single devices, one or more actions of each of the server devices 204(1)-204 (n) may be distributed across one or more distinct network computing devices that together comprise one or more of the server devices 204(1)-204 (n). Moreover, the server devices 204(1)-204 (n) are not limited to a particular configuration. Thus, the server devices 204(1)-204 (n) may contain a plurality of network computing devices that operate using a controller/agent approach, whereby one of the network computing devices of the server devices 204(1)-204 (n) operates to manage and/or otherwise coordinate operations of the other network computing devices.

The server devices 204(1)-204 (n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208 (n) may also be the same or similar to the computer system 102 or the computer device 120 as described with respect to FIG. 1, including any features or combination of features described with respect thereto. For example, the client devices 208(1)-208 (n) in this example may include any type of computing device that can interact with the CPM device 202 via communication network(s) 210. Accordingly, the client devices 208(1)-208 (n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208 (n) may run interface applications, such as standard web browsers or standalone client applications, which may provide an interface to communicate with the CPM device 202 via the communication network(s) 210 in order to communicate user requests and information. The client devices 208(1)-208 (n) may further include, among other features, a display device, such as a display screen or touchscreen, and/or an input device, such as a keyboard, for example.

Although the exemplary network environment 200 with the CPM device 202, the server devices 204(1)-204 (n), the client devices 208(1)-208 (n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CPM device 202, the server devices 204(1)-204 (n), or the client devices 208(1)-208 (n), for example, may be configured to operate as virtual instances on the same physical machine. In other words, one or more of the CPM device 202, the server devices 204(1)-204 (n), or the client devices 208(1)-208 (n) may operate on the same physical device rather than as separate devices communicating through communication network(s) 210. Additionally, there may be more or fewer CPM devices 202, server devices 204(1)-204 (n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
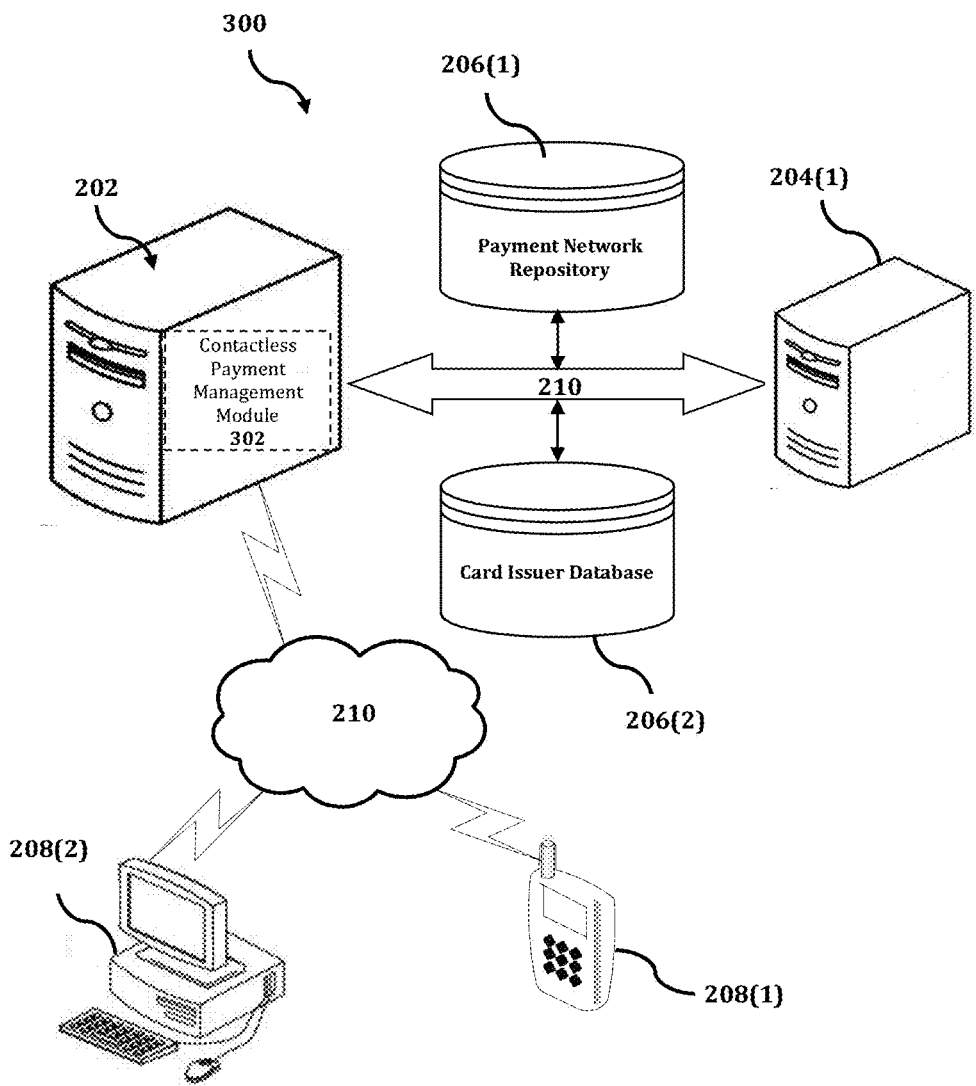
FIG. 3 shows an exemplary system for implementing a method for facilitating contactless payment at a point-of-sale by using machine-readable optical labels and remote wallets.

The CPM device 202 is described and shown in FIG. 3 as including a contactless payment management module 302, although it may include other rules, policies, modules, databases, or applications, for example. As will be described below, the contactless payment management module 302 is configured to implement a method for facilitating contactless payment at a point-of-sale by using machine-readable optical labels and remote wallets.

An exemplary process 300 for implementing a mechanism for facilitating contactless payment at a point-of-sale by using machine-readable optical labels and remote wallets by utilizing the network environment of FIG. 2 is shown as being executed in FIG. 3. Specifically, a first client device 208(1) and a second client device 208(2) are illustrated as being in communication with CPM device 202. In this regard, the first client device 208(1) and the second client device 208(2) may be "clients" of the CPM device 202 and are described herein as such. Nevertheless, it is to be known and understood that the first client device 208(1) and/or the second client device 208(2) need not necessarily be "clients" of the CPM device 202, or any entity described in association therewith herein. Any additional or alternative relationship may exist between either or both of the first client device 208(1) and the second client device 208(2) and the CPM device 202, or no relationship may exist.

Further, CPM device 202 is illustrated as being able to access a payment network repository 206(1) and a card issuer database 206(2). The contactless payment management module 302 may be configured to access these databases for implementing a method for facilitating contactless payment at a point-of-sale by using machine-readable optical labels and remote wallets.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CPM device 202 via broadband or cellular communication. Of course, these embodiments are merely exemplary and are not limiting or exhaustive.

Upon being started, the contactless payment management module 302 executes a process for facilitating contactless payment at a point-of-sale by using machine-readable optical labels and remote wallets. An exemplary process for facilitating contactless payment at a point-of-sale by using machine-readable optical labels and remote wallets is generally indicated at flowchart 400 in FIG. 4.

Figure 4:
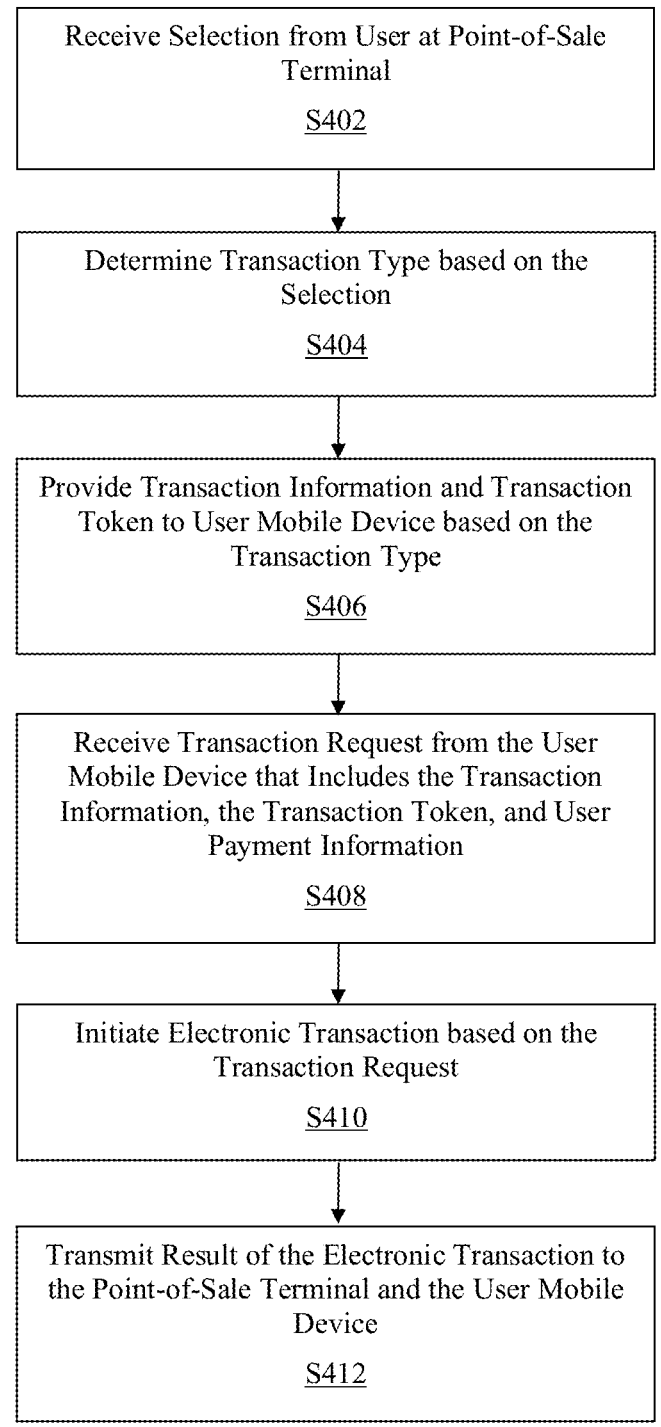
FIG. 4 is a flowchart of an exemplary process for implementing a method for facilitating contactless payment at a point-of-sale by using machine-readable optical labels and remote wallets.

In the process 400 of FIG. 4, at step S402, a selection may be received from a user at the point-of-sale via a terminal. The selection may correspond to a payment preference. In an exemplary embodiment, the selection may be received as an input on a graphical user interface that is displayed on the terminal. The user may interact with graphical elements on the graphical user interface to provide the input. For example, the user may touch a graphical element that corresponds to option A on a graphical user interface that is displayed on a touch screen of the terminal to indicate a desire to select option A. As will be appreciated by a person of ordinary skill in the art, the user may interact with the terminal physically such as, for example, via a touch screen display and/or physical input devices as well as interact with the terminal virtually such as, for example, via voice prompts.

In another exemplary embodiment, the terminal may correspond to a point-of-sale (POS) terminal that is operated by a vendor. The POS terminal may relate to computing hardware that enables vendors and merchants to process payments to complete a purchase transaction. The POS terminal may include dedicated transaction devices such as, for example, cash registers as well as multipurpose computing devices such as, for example, smartphones with plugged-in card readers that process payments. In another exemplary embodiment, the terminal may correspond to a computing terminal that is usable by the user for electronic commerce. The computing terminal may relate to computing hardware such as, for example, a personal computing device that enables the user to make remote purchases via a public network such as, for example, the internet. For example, the user may use the personal computing device to make purchases from a vendor website.

In another exemplary embodiment, the selection may be made by the user from a plurality of selections displayed via the terminal. The selection may indicate a desired payment preference of the user. For example, the user may select an option to pay for goods and services at the point-of-sale by using a mobile wallet. Selection of the mobile wallet may indicate a desire by the user to complete the transaction by using the mobile wallet. In another exemplary embodiment, the payment preference may include at least one from among a credit card payment preference, a debit card payment preference, a digital payment network preference, and a mobile wallet payment preference. The digital payment network may relate to a payment network such as, for example, a ZELLE network that enables electronic transactions from one user account to another.

At step S404, a transaction type may be determined based on the selection. The transaction type may include at least one from among a first transaction via a digital payment network and a second transaction via a mobile wallet. In an exemplary embodiment, the first transaction may correspond to a payment type that utilizes a digital payment network such as, for example, the ZELLE network to facilitate the transaction. Consistent with present disclosures, the digital payment network may enable electronic transactions between a plurality of users at the point-of-sale. In another exemplary embodiment, the second transaction may correspond to a payment type that utilizes a mobile wallet to facilitate the transaction. The mobile wallet may relate to a digital wallet that stores payment card information on a mobile device such as, for example, a smartphone and/or a smart watch. Consistent with present disclosures, the mobile wallet may be a convenient way for the user to make payments using the stored payment card information without physical payment cards.

At step S406, transaction information and a transaction token may be provided to a mobile device that is associated with the user via the terminal. The transaction information and the transaction token may be provided to the mobile device based on the determined transaction type. In an exemplary embodiment, the transaction information may correspond to payment parameters for the electronic transaction. The payment parameters may include transaction specific information such as, for example, a transaction amount and a vendor identifier. The payment parameters may also include technical information that may be usable to facilitate the transaction such as, for example, an Internet Protocol (IP) address of the vendor.

In another exemplary embodiment, the transaction token may correspond to an electronic key that is associated with the transaction and usable to verify the transaction. The electronic key may include a piece of information such as, for example, a cryptographic key that, when processed through a cryptographic algorithm, may encode and/or decode cryptographic data. In another exemplary embodiment, the transaction token may correspond to an output of a tokenization process that, when applied to data security, substitutes a sensitive data element with a non-sensitive equivalent that has no intrinsic or exploitable meaning or value. The transaction token may relate to a reference that maps back to the sensitive data. Consistent with present disclosures, the transaction token may be usable in the claimed invention to facilitate secured transfer of sensitive payment data from the user to the vendor.

In another exemplary embodiment, when the transaction type corresponds to the first transaction, a code such as, for example, a quick response (QR) code may be used to provide the transaction information and the transaction token to the mobile device. To facilitate the providing, a code may be generated. The code may correspond to a machine-readable optical label that includes the transaction information and the transaction token. The machine-readable optical label may relate to any of a plurality of matrix barcodes that can store data. Then, after generation, the code may be displayed via the terminal for the user in response to the selection. The displayed code may be scannable by the mobile device to initiate a transaction request according to the transaction information. For example, the user may use a camera module together with software components such as an application to scan the displayed code and initiate the transaction.

In another exemplary embodiment, when the transaction type corresponds to the second transaction, a remote payment option such as, for example, a mobile wallet may be used to provide the transaction information and the transaction token to the mobile device. To facilitate the providing, prompts may be displayed for the user via the terminal in response to the selection. The prompts may include requests for additional information that relates to a preferred communication channel. The preferred communication channel may include at least one from among a cellular text, an email, and a push notification on the mobile device. The additional information requested may include at least one from among a phone number, an email address, and a user login.

Then, a payment link and a corresponding web application that includes the transaction information and the transaction token may be generated. The payment link may be transmitted to the user via the preferred communication channel according to the requested information. For example, when requested, the user may indicate that an email is the preferred communication channel and provide a corresponding email address. Based on the user indication, the payment link may be sent in an electronic message via email to the user provided email address. The user may interact with the web application to trigger the mobile wallet to initiate the transaction request according to the transaction information.

In another exemplary embodiment, an application on the mobile device may be usable to receive the provided transaction information and the transaction token from the terminal. For example, the user may use the application to scan the QR code displayed on the terminal to initiate a transaction when the transaction type corresponds to the first transaction. Similarly, the user may interact with the payment link received in an email to open the application and initiate a transaction when the transaction type corresponds to the second transaction.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S408, a transaction request that includes the transaction information, the transaction token, and user payment information may be received via the mobile device. In an exemplary embodiment, the transaction request may be received from the mobile device after the transaction is verified by the user. For example, the user may scan a QR code to retrieve transaction information and then verify the transaction amount prior to initiating the transaction request. In another exemplary embodiment, the user may attach desired user payment information to facilitate the transaction. The user payment information may relate to financial data such as, for example, an account number of the user. For example, the user may select a specific credit account to complete the transaction initiated by scanning the QR code.

At step S410, an electronic transaction based on the transaction request may be initiated. In an exemplary embodiment, the transaction request may be forwarded to a card issuer and/or a payment network to complete the transaction. The card issuer and/or the payment network may correspond to financial institutions that direct the transfer of funds from the user to the vendor. For example, the financial institutions may remove funds consistent with the transaction amount from a user account for deposit in a vendor account. In another exemplary embodiment, the card issuer and/or the payment network may represent a single financial institution as well as several financial institutions in a financial network. The card issuer and/or the payment network may correspond to first-party banking institutions where user and vendor accounts reside as well as third-party payment processing services.

In another exemplary embodiment, prior to initiating the electronic transaction, the transaction request may be validated by using the transaction token. Consistent with present disclosures, the transaction token may be used as a key to decrypt the transaction request for verification of authenticity. Similarly, the transaction token may be decrypted to retrieve sensitive user data for verification of the user as well as the transaction request. As will be appreciated by a user of ordinary skill in the art, the transaction token may be used in either configuration to facilitate the validation process.

At step S412, a result of the electronic transaction may be transmitted to the terminal and to the mobile device. In an exemplary embodiment, a transaction success message may be transmitted to both the terminal and the mobile device. The transaction success message may notify the user as well as the vendor that the requested transaction was completed successfully. In another exemplary embodiment, a transaction failure message may be transmitted to both the terminal and the mobile device. The transaction failure message may notify the user as well as the vendor that the requested transaction was not successfully completed. The transaction failure message may include aggregated error messages to provide additional information as to why the transaction failed. For example, the transaction failure message may provide that the requested transaction was not successful due to insufficient funds.

Figure 5:
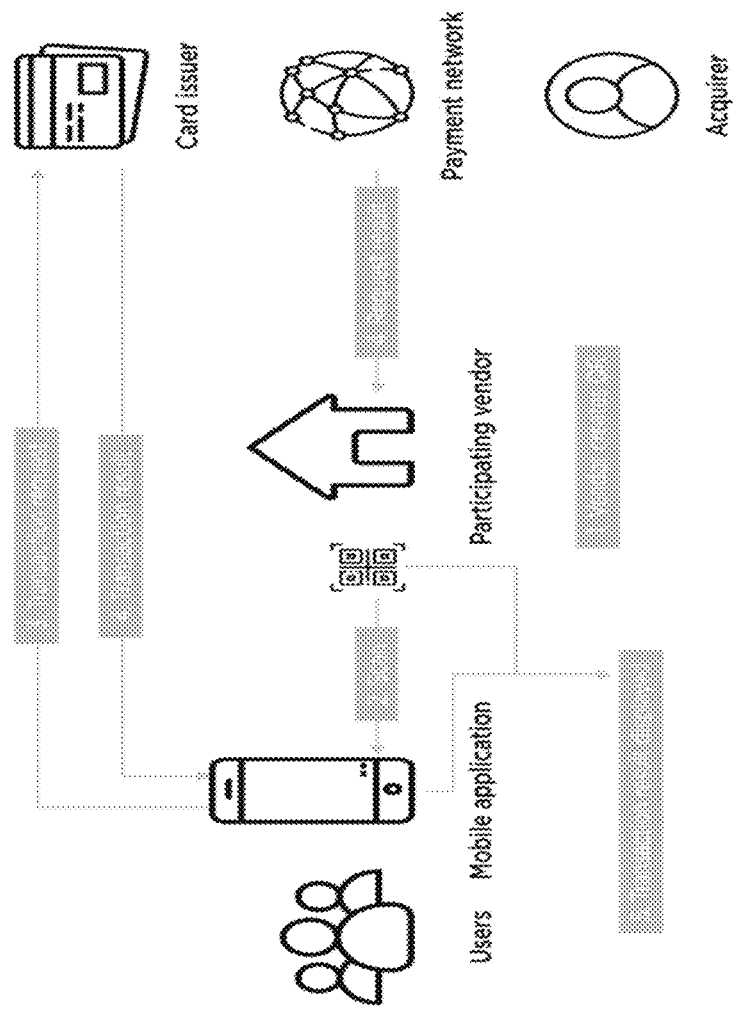
FIG. 5 is a flow diagram of an exemplary process for implementing a method for facilitating contactless payment at a point-of-sale by using machine-readable optical labels and remote wallets.

FIG. 5 is a flow diagram 500 of an exemplary process for implementing a method for facilitating contactless payment at a point-of-sale by using machine-readable optical labels and remote wallets. In FIG. 5, the first transaction type has been selected by the user for completion of the transaction at the point-of-sale consistent with present disclosure.

As illustrated in FIG. 5, at step 1, a vendor may create a QR code that includes the transaction information and the transaction token. At step 2, a mobile application on the mobile device of the user may be used to scan the QR code and retrieve the transaction information and the transaction token. A step 3, the mobile application generates a transaction request and sends the transaction request to a card issuer for processing. At step 4, the mobile application receives a transaction result from the card issuer. Alternatively, in step 4, the vendor may request transaction results from a payment network when the second transaction type is initiated by the user. Finally, at step 5 the transaction results may be displayable for the user via the mobile application as well as for the vendor via a POS terminal.

Figure 6:
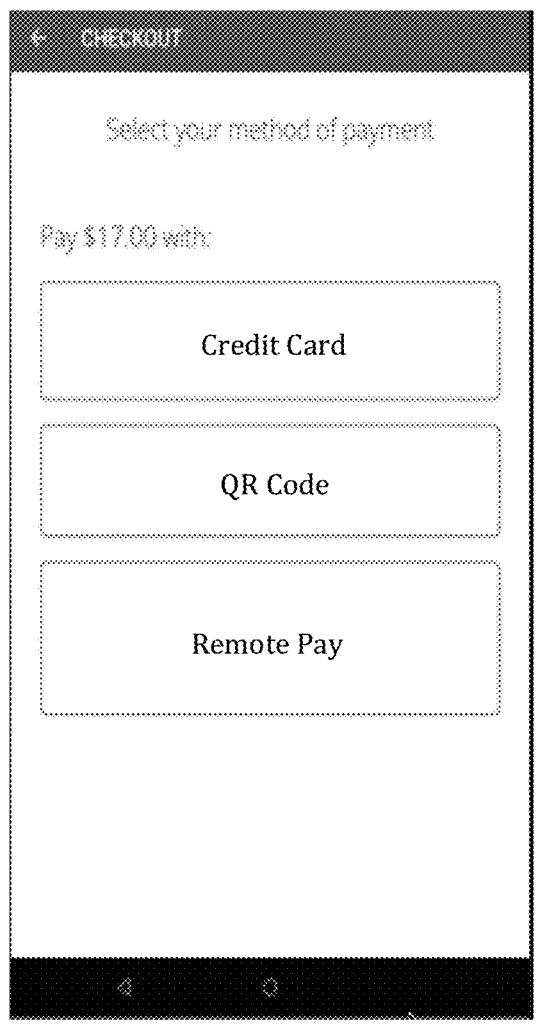
FIG. 6 is a screen shot of a selection screen that illustrates a graphical user interface that is usable for implementing a method for facilitating contactless payment at a point-of-sale by using machine-readable optical labels and remote wallets, according to an exemplary embodiment.

FIG. 6 is a screen shot 600 of a selection screen that illustrates a graphical user interface that is usable for implementing a method for facilitating contactless payment at a point-of-sale by using machine-readable optical labels and remote wallets, according to an exemplary embodiment. In FIG. 6, the selection screen may be displayable via a POS terminal as well as via a mobile device based on the transaction type. For example, the selection screen may be displayable via the POS terminal for the first transaction. Conversely, the selection screen may be displayable via the mobile device for the second transaction.

As illustrated in FIG. 6, a user may be presented with various options via a graphical user interface. The user may interact with the graphical user interface to select a desired method of payment. In another exemplary embodiment, the selection screen may also display transaction information for the user to help the user decide. For instance, the selection screen may provide that the current transaction is for $17 dollars.

Figure 7:
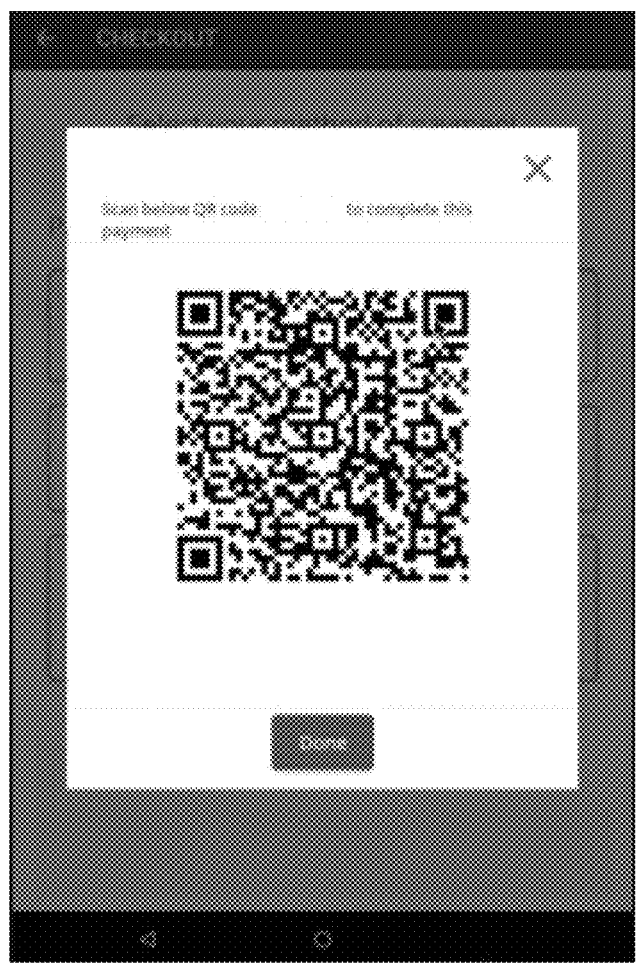
FIG. 7 is a screen shot of a code scan screen that illustrates a graphical user interface that is usable for implementing a method for facilitating contactless payment at a point-of-sale by using machine-readable optical labels and remote wallets, according to an exemplary embodiment.

FIG. 7 is a screen shot 700 of a code scan screen that illustrates a graphical user interface that is usable for implementing a method for facilitating contactless payment at a point-of-sale by using machine-readable optical labels and remote wallets, according to an exemplary embodiment. In FIG. 7, the code scan screen may be presented to the user when the user selects the first transaction. Consistent with present disclosures, the first transaction may correspond to a transaction made via a digital payment network such as, for example, the ZELLE network.

As illustrated in FIG. 7, the code scan screen may display a code such as, for example, a QR code for scanning by the user. The code scan screen may include instructions on how to complete the payment by using the code. Consistent with present disclosures, the code may include the transaction information and the transaction token, which are usable by the mobile device to initiate a transaction.

Figure 8:
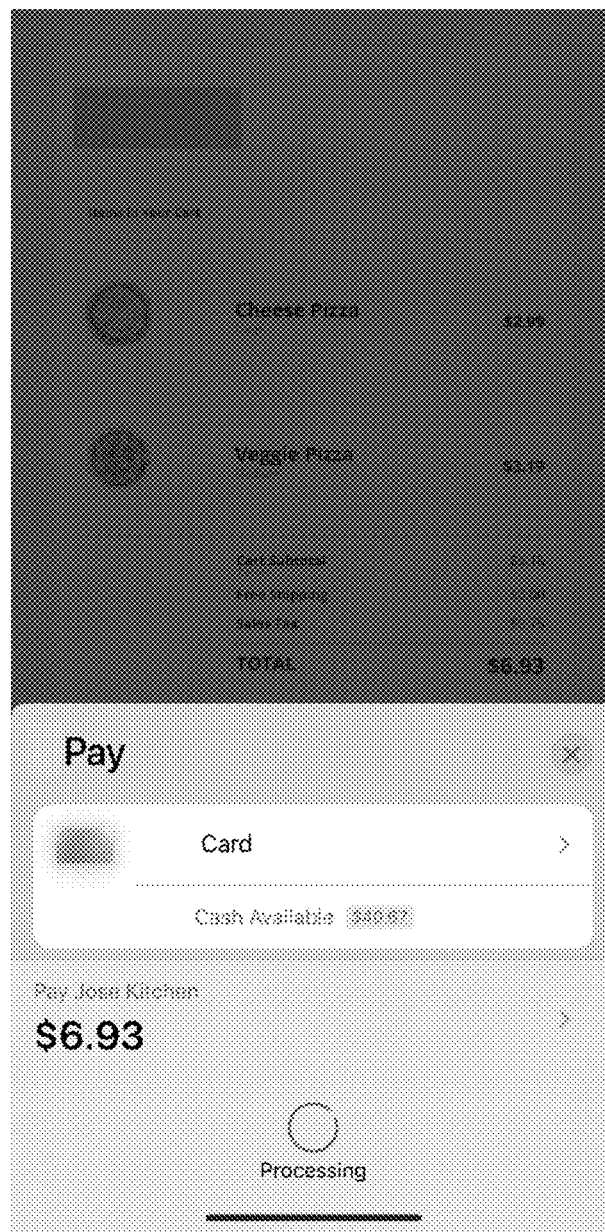
FIG. 8 is a screen shot of a mobile wallet payment screen that illustrates a graphical user interface that is usable for implementing a method for facilitating contactless payment at a point-of-sale by using machine-readable optical labels and remote wallets, according to an exemplary embodiment.

FIG. 8 is a screen shot 800 of a mobile wallet payment screen that illustrates a graphical user interface that is usable for implementing a method for facilitating contactless payment at a point-of-sale by using machine-readable optical labels and remote wallets, according to an exemplary embodiment. In FIG. 8, the mobile wallet payment screen may be presented to the user when the user selects the second transaction. Consistent with present disclosures, the second transaction may correspond to a transaction such as, for example, a remote transaction that is made by using the mobile wallet.

As illustrated in FIG. 8, the mobile wallet payment screen may be automatically triggered when the user interacts with the payment link. Consistent with present disclosures, the user may receive the payment link in the preferred communication channel. Interaction with the payment link may open a web application that identifies an operating system of the mobile device and automatically triggers the corresponding mobile wallet.

Accordingly, with this technology, an optimized process for facilitating contactless payment at a point-of-sale by using machine-readable optical labels and remote wallets is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating transaction information verification during contactless payment at a point-of-sale, the method being implemented by at least one processor and a point-of-sale terminal device, the method comprising:
    displaying, by the at least one processor and the point-of-sale terminal device, via a graphical user interface, an input request for selecting a payment preference;
    receiving, by the at least one processor via the point-of-sale terminal device, at least one selection from a user at the point-of-sale, the at least one selection corresponding to the payment preference;
    determining, by the at least one processor, a transaction type based on the at least one selection, the transaction type including at least one from among a first transaction via a digital payment network that relates to a payment network that enables electronic type transactions and a second transaction via a mobile wallet that relates to a payment card associated with the user;
    generating, by the at least one processor, a transaction token by a tokenization process that substitutes sensitive data with non-sensitive equivalents, wherein the transaction token relates to a reference that maps the non-sensitive equivalents to the sensitive data;
    generating, by the at least one processor, a payment link and a corresponding web application that includes transaction information and the transaction token;
    displaying, by the at least one processor via the graphical user interface, a machine-readable optical label that relates to the payment link and the corresponding web application;
    scanning, by the at least one processor via a mobile device associated with the user, the machine-readable optical label;
    transmitting, by the at least one processor via the point-of-sale terminal device, the transaction information and the transaction token to the mobile device based on the scanning of the machine-readable optical label;

receiving, by the at least one processor via the mobile device, a transaction request that includes the transaction information, the transaction token, and user payment information;

validating, by the at least one processor, the transaction request by using the transaction token, wherein the transaction token decrypts the transaction request to verify authenticity of the transaction request;

initiating, by the at least one processor, an electronic transaction based on the transaction request;

completing, by the at least one processor, the electronic transaction by directing a transfer of funds from an account of the user to a vendor account; and transmitting, by the at least one processor, a result of the electronic transaction to the point-of-sale terminal device and to the mobile device.

2. The method of claim 1, wherein the digital payment network enables at least one electronic transaction between a plurality of users at the point-of-sale.

3. The method of claim 1, wherein the point-of-sale terminal device is operated by a vendor.

4. The method of claim 1, wherein, when the transaction type corresponds to the first transaction, the transmitting of the transaction information and the transaction token to the mobile device further comprises:

generating, by the at least one processor, at least one code, the at least one code corresponding to the machine-readable optical label; and displaying, by the at least one processor via the point-of-sale terminal device, the at least one code for the user in response to the at least one selection, wherein the at least one code is scannable by the mobile device to initiate the transaction request according to the transaction information.

5. The method of claim 1, wherein, when the transaction type corresponds to the second transaction, the transmitting of the transaction information and the transaction token to the mobile device further comprises:

displaying, by the at least one processor via the point-of-sale terminal device, at least one prompt for the user in response to the at least one selection, the at least one prompt including a request for information relating to a preferred communication channel; and transmitting, by the at least one processor via the preferred communication channel, the payment link to the user according to the requested information, wherein interaction with the web application triggers the mobile wallet to initiate the transaction request according to the transaction information, and wherein the corresponding web application includes a microservice application that includes event producers and event consumers, wherein the event producers detect a change in state of hardware of the computing device, and wherein the event producers transmit a message relating the detected change to the event consumer for processing.

6. The method of claim 5, wherein the preferred communication channel includes at least one from among a cellular text, an email, and a push notification for the mobile device.

7. The method of claim 5, wherein the requested information includes at least one from among a phone number, an email address, and a user login.

8. The method of claim 1, wherein the transaction information corresponds to at least one payment parameter for the electronic transaction, the at least one payment parameter including a transaction amount and a vendor identifier.

9. The method of claim 1, wherein the transaction token is processed by a cryptographic algorithm to perform at least one from among encoding and decoding cryptographic data to retrieve the sensitive data for verifying the user and the transaction request.

10. A computing device configured to implement an execution of a method for facilitating transaction information verification during contactless payment at a point-of-sale, the computing device comprising:

a processor;

a memory;

a point-of-sale terminal device; and a communication interface coupled to each of the processor, the point-of-sale terminal device, and the memory, wherein the processor and the point-of-sale terminal device are configured to:

display, via a graphical user interface of the point-of-sale terminal device, an input request for selecting a payment preference;

receive at least one selection from a user at the point-of-sale, the at least one selection corresponding to a payment preference;

determine a transaction type based on the at least one selection, the transaction type including at least one from among a first transaction via a digital payment network that relates to a payment network that enables electronic type transactions and a second transaction via a mobile wallet that relates to a payment card associated with the user;

generate a transaction token by a tokenization process that substitutes sensitive data with non-sensitive equivalents, wherein the transaction token relates to a reference that maps the non-sensitive equivalents to the sensitive data;

generate a payment link and a corresponding web application that includes transaction information and the transaction token;

display, by the graphical user interface, a machine-readable optical label that relates to the payment link and the corresponding web application;

scan, via a mobile device associated with the user, the machine-readable optical label;

transmit, via the point-of-sale terminal device, the transaction information and the transaction token to the mobile device based on the scan of the machine-readable optical label;

receive, via the mobile device, a transaction request that includes the transaction information, the transaction token, and user payment information;

validate the transaction request by using the transaction token, wherein the transaction token decrypts the transaction request to verify authenticity of the transaction request;

initiate an electronic transaction based on the transaction request;

complete the electronic transaction by directing a transfer of funds from an account of the user to a vendor account; and transmit a result of the electronic transaction to the point-of-sale terminal device and to the mobile device.

11. The computing device of claim 10, wherein the digital payment network enables at least one electronic transaction between a plurality of users at the point-of-sale.

12. The computing device of claim 10, wherein the point-of-sale terminal device operated by a vendor.

13. The computing device of claim 10, wherein, to transmit the transaction information and the transaction token to the mobile device when the transaction type corresponds to the first transaction, the processor is further configured to:
generate at least one code, the at least one code corresponding to the machine-readable optical label; and
display, via the point-of-sale terminal device, the at least one code for the user in response to the at least one selection,
wherein the at least one code is scannable by the mobile device to initiate the transaction request according to the transaction information.

14. The computing device of claim 10, wherein, to transmit the transaction information and the transaction token to the mobile device when the transaction type corresponds to the second transaction, the processor is further configured to:
display, via the point-of-sale terminal device, at least one prompt for the user in response to the at least one selection, the at least one prompt including a request for information relating to a preferred communication channel;
generate a payment link and a corresponding web application that includes the transaction information and the transaction token; and
transmit, via the preferred communication channel, the payment link to the user according to the requested information,
wherein interaction with the web application triggers the mobile wallet to initiate the transaction request according to the transaction information, and wherein the corresponding web application includes a microservice application that includes event producers and event consumers, wherein the event producers detect a change in state of hardware of the computing device, and wherein the event producers transmit a message relating the detected change to the event consumer for processing.

15. The computing device of claim 14, wherein the preferred communication channel includes at least one from among a cellular text, an email, and a push notification for the mobile device.

16. The computing device of claim 14, wherein the requested information includes at least one from among a phone number, an email address, and a user login.

17. The computing device of claim 10, wherein the transaction information corresponds to at least one payment parameter for the electronic transaction, the at least one payment parameter including a transaction amount and a vendor identifier.

18. The computing device of claim 10,
wherein the transaction token is processed by a cryptographic algorithm to perform at least one from among encoding and decoding cryptographic data to retrieve the sensitive data for verifying the user and the transaction request.

19. A non-transitory computer readable storage medium storing instructions for facilitating transaction information verification during contactless payment at a point-of-sale, the storage medium comprising executable code which, when executed by a processor and a point-of-sale terminal device, causes the processor and the point-of-sale terminal device to:
display, via a graphical user interface of the point-of-sale terminal device, an input request for selecting a payment preference;
receive at least one selection from a user at the point-of-sale, the at least one selection corresponding to a payment preference;
determine a transaction type based on the at least one selection, the transaction type including at least one from among a first transaction via a digital payment network that relates to a payment network that enables electronic type transactions and a second transaction via a mobile wallet that relates to a payment card associated with the user;
generate a transaction token by a tokenization process that substitutes sensitive data with non-sensitive equivalents, wherein the transaction token relates to a reference that maps the non-sensitive equivalents to the sensitive data;
generate a payment link and a corresponding web application that includes transaction information and the transaction token;
display, by the graphical user interface, a machine-readable optical label that relates to the payment link and the corresponding web application;
scan, via a mobile device associated with the user, the machine-readable optical label;
transmit, via the point-of-sale terminal device, the transaction information and the transaction token to the mobile device based on the scan of the machine-readable optical label;
receive, via the mobile device, a transaction request that includes the transaction information, the transaction token, and user payment information;
validate the transaction request by using the transaction token, wherein the transaction token decrypts the transaction request to verify authenticity of the transaction request;
initiate an electronic transaction based on the transaction request;
complete the electronic transaction by directing a transfer of funds from an account of the user to a vendor account; and
transmit a result of the electronic transaction to the point-of-sale terminal device and to the mobile device.

20. The storage medium of claim 19, wherein the digital payment network enables at least one electronic transaction between a plurality of users at the point-of-sale, and wherein the point-of-sale terminal device is operated by a vendor.

* * * * *